Oct. 2, 1945.  C. H. HOLDER  2,386,050
SUSTAINING THE ACTIVITY OF REFORMING CATALYSTS
Filed Nov. 12, 1943
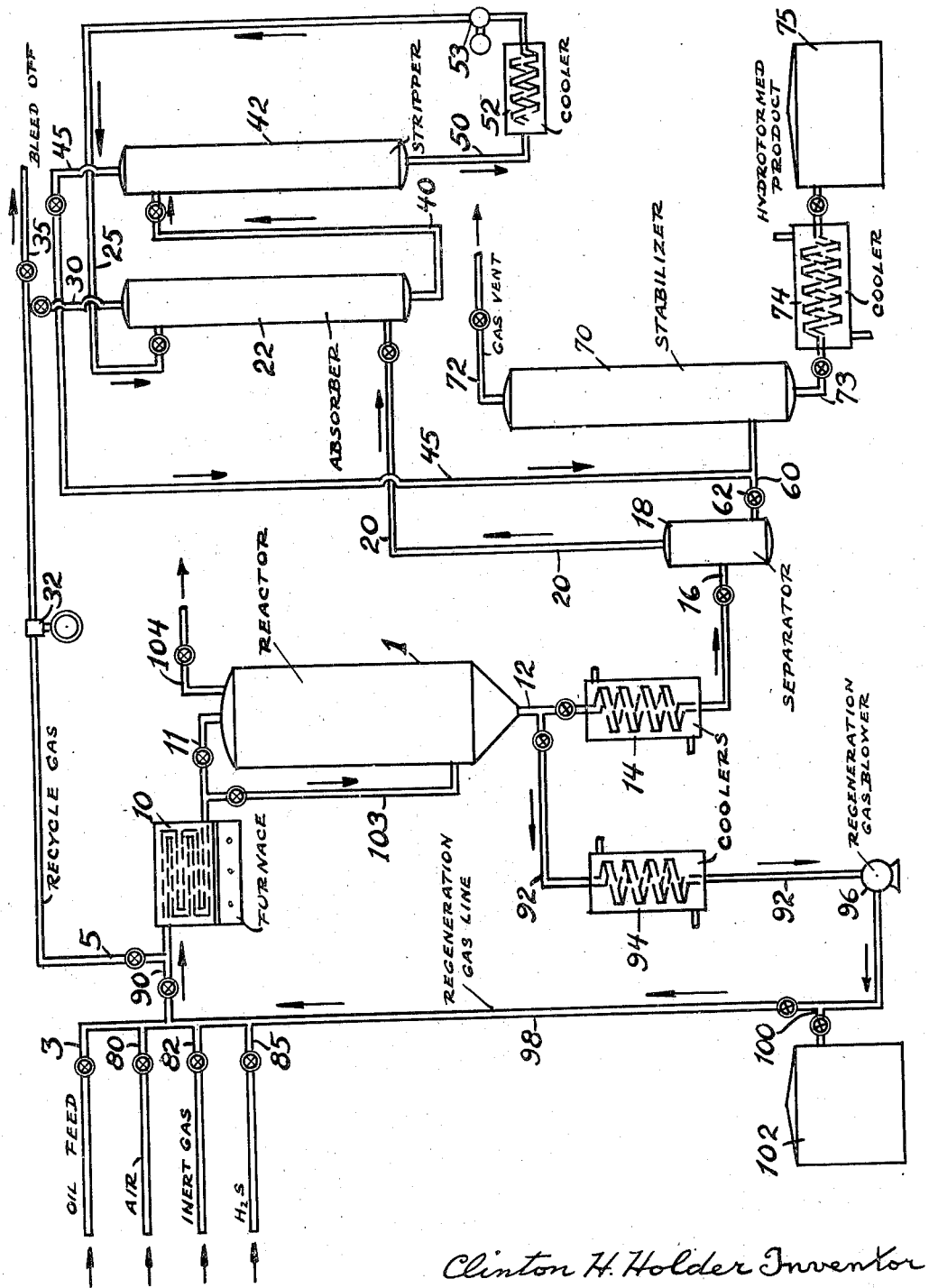
Clinton H. Holder Inventor
By P. H. Young Attorney Patented Oct. 2, 1945

2,386,050

UNITED STATES PATENT OFFICE 2,386,050

SUSTAINING THE ACTIVITY OF REFORMING CATALYSTS

Clinton H. Holder, Cranford, N. J., assignor to Standard Oil Development Company, a corporation of Delaware Application November 12, 1943, Serial No. 510,071

6 Claims. (Cl. 196—50)

The present invention relates to improvements in the catalytic treatment of hydrocarbon oils to produce aromatics, and more particularly it relates to improvements resulting in maintaining the activity of catalysts, such as dehydrogenation catalysts, on a high level of activity.

A large number of commercial chemical process operations are today carried out in the presence of catalysts. Of course, in all of these processes the activity of the catalyst is a major consideration for invariably the success of the process depends on maintaining the catalyst, particularly in a continuous operation, at a high level of activity. Very few processes employing a catalyst can be conducted so as to produce 100 per cent yields of charged material. This is particularly true in the catalytic treatment of petroleum oils. Thus, for example, in the catalytic cracking of gas oil to form gasoline, a process is considered to be operating satisfactorily when the yields are of the order of 45-50% cracked gasoline based on the volume of gas oil charged. The same is true in the dehydrogenation of, say, butene to give butadiene, and is otherwise true in a number of processes. The difficulty of a great many of these processes, however, is that as the catalyst becomes old in the process its activity tends to decline for one reason or another. For example, in the reforming of naphthas, even the best catalysts developed heretofore tend to lose activity which is manifested in reduced yields of the desired product after the catalyst has passed through a large number of cycles, including the productive phase and the necessary regeneration phase. For instance, a study has been made of a reforming catalyst which, when freshly prepared and used, was adapted to catalyze the process so that 70 volume per cent of toluene based on the methylcyclohexane fed to the process resulted as initial yields, but after five months in use the toluene yield was reduced to 56%, even though the operating conditions were uniform throughout the standard run. It is believed obvious that any method or treatment of the catalyst which would increase the toluene yield from the low figure given would be of the utmost importance, and my present invention has to do with a treatment of catalysts which have lost activity, so as to restore at least a part of that acivity.

While my invention is of general applicability, I shall illustrate a preferred modification thereof in terms of the restoration of a reforming catalyst and shall describe increasing the activity of a catalyst which has been decreased by continued use.

During the course of certain investigations, I observed that where molybdenum oxide catalysts supported on activated alumina, wherein the molybdenum oxide constituted 8 weight per cent of the total catalyst mass, were used that hydrogen sulfide reacted with the white, highly oxidized catalyst and formed a black material (presumably the sulfide) which in turn changed to a white color by oxidation in air. The reaction which occurred probably can be represented as follows:

For sulfiding

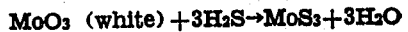

$MoO_3$ (white) $+3H_2S \rightarrow MoS_3+3H_2O$

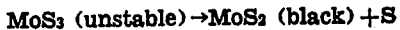

$MoS_3$ (unstable) $\rightarrow MoS_2$ (black) $+S$ and for oxidation

$2MoS_2+7O_2 \rightarrow 2MoO_3$ (white) $+4SO_2$

Other evidence obtained by X-ray analysis indicated the presence of a compound consisting of molybdenum oxide and the catalyst carrier when the used low activity catalyst was examined. It was concluded that if an appreciable loss in the catalyst activity was due to a chemical compound formation in this manner, it might be possible to restore the activity of the used molybdenum oxide catalyst by first reacting the oxide catalyst with hydrogen sulfide and reoxidizing (as indicated above). On the other hand, it was felt that reactivation of the catalyst might occur due to a change in the surface characteristics, to give a preferred adsorption and hence a more efficient dehydrogenation. In other words, the resulting oxide surface formed from the sulfide might possess different and desirable characteristics compared to those after a normal regeneration and pretreatment. It should be explained, of course, that in using the above catalyst in the reforming of naphthas, that during the reforming operation proper, tarry and coke-like deposits are formed on the catalyst which deposits necessitate discontinuing the reforming operation and regenerating the catalyst by treating with an oxygen-containing gas at elevated temperatures.

In order to test the feasibility of the theory regarding the changes that might take place in the catalyst during repeated use in cycles of reforming and regeneration, four runs were made using a catalyst having the composition as set forth below, in which in three cases the regenerated oxidized catalyst was treated with an excess of $H_2S$ and in the other case the regenerated reduced catalyst was treated with $H_2S$ and in all cases the sulfided catalysts were reoxidized and then reduced at atmospheric pressure prior to starting the oil feed. The catalyst employed was typical of its type and consisted of 8.0 weight per cent MoO3 supported on activated alumina (92%). The runs were carried out in a 1 bbl./day pilot plant "hydroformer"[1] having adiabatically wound heating elements. The operating procedure may be broken down into the following steps:

[1] Hydroforming is an operation in which petroleum oil, usually a naphthhene-containing naphtha, is treated at around 900° F. and a pressure of about 240 lbs./square inch gauge using a catalyst and also using added hydrogen. It differs from reforming in that added hydrogen is included in the charge to the reaction zone.

reactor 1. The feed stock passes through the reactor under the conditions previously stated and is withdrawn through line 12, thence cooled in a cooler 14, thence passed via line 16 into a high pressure separator 18. In high pressure separator 18 the hydrogen or hydrogen-containing gas is withdrawn overhead through line 20. In the reforming, of course, normally gaseous hydrocarbons are formed and these pass overhead through separator 18 to line 20, and it is desirable to remove them from the gas before recycling the said gas. To this end, therefore, the gas in line 20 is passed through an absorber 22 where

Example

| Hrs.:min. | Step | Conditions | Direction of flow |
|---|---|---|---|
| 4 hrs | Reaction period | 215#/sq. in. ga., 0.65 v./v./hr., 2500 CF/B recycle gas rate, 900° F. avg. catalyst temperature with approx. 1100°F. inlet temp. | Down. |
| 15 mins | Recycle gas (regeneration fumes or flue gas) purge. | Catalyst regenerated at 215#/sq. in. ga. into recovery system using 59 CF of recycle gas/hr./C. F. of catalyst. | Up. |
| 19 mins | Nitrogen purge | Reactor purged to vent using 36 CF of nitrogen/hr./CF of catalyst. | Up. |
| (Approx. 45 mins.) | Regeneration | Catalyst regenerated at 200#/sq. in. ga. with air using recycle flue gas as diluent. Inlet temp. 800°F., maximum catalyst temp. 1100°F. | Down. |
| (Approx. 85 mins.) | Air recycle | After O2 appeared in reactor outlet stream air was admitted to reactor at same rate as in regeneration and recycled at rate of 1600 CF/hr. CF of catalyst. | Down. |
| 5 mins | Depressuring | Reactor depressured to atmospheric pressure. Gas to vent. | Up. |
| 1 hr | Nitrogen purge | Reactor purged to vent using 36-93 CF of nitrogen/hr./CF of catalyst. | Up. |
| 1 hr | Hydrogen sulfide purge | Reactor purged to vent using 47 CF of hydrogen sulfide/hr./CF of cat. Catalyst at atm. pressure and approximately 910° F. | Up. |
| 1 hr | Nitrogen purge | Reactor purged to vent using 93 CF of nitrogen/hr./CF catalyst. | Up. |
| 5 mins | Repressuring | Reactor repressured with nitrogen 200#/sq. in. ga. | Up. |
| (Approx. 2 hrs.) | Reoxidation | Catalyst reoxidized at 200#/sq. in. ga. with air using 1600 CF of recycle flue gas/hr./CF of catalyst as diluent. Inlet temperature 800°F., maximum catalyst temperature 1100°F. | Down. |
| (Approx. 2 hrs.) | Air recycle | After O2 appeared in reactor outlet stream air was continued to be admitted to reactor at same rate as in reoxidation and recycled at rate of 1600 CF/hr./CF of catalyst. | Down. |
| 5 mins | Depressuring | Reactor depressured to atmospheric pressure. Gas to vent. | Up. |
| 1 hr | Nitrogen purge | Reactor purged to vent using 36-93 CF of nitrogen/hr./CF of catalyst. | Up. |
| 15 mins | Recycle gas purge | Reactor purged at atmospheric pressure to vent using 59 CF of recycle gas/hr./CF of catalyst. | Up. |
| 8 mins | Repressuring | Reactor repressured to 215#/sq. in. gauge using recycle gas. | Up. |
| 4 hrs | Reaction period | | |

Total cycle time approximately 15.5 hours.

The data obtained when using the modification of the normal operating procedure as disclosed herein is shown in the table below:

Effect of H2S treatment

| | A | B | C | D | E | F |
|---|---|---|---|---|---|---|
| Cycle No | 44 | 45 | 53 | 54 | 55 | 56 |
| Previous treatment | Normal regen. | | | Plus 1 hr. reduc. with H2 | Normal | |
| H2S treatment | 1 hr. Atmospheric pressure | | | 2 hrs. | None | |
| Subsequent treatment | Reoxidation plus normal recycle gas purge | | | | Normal R. G. purge | |
| Toluene yield,[2] vol. per cent. | 64.5 | 62.0 | | 63.2 | 59.0 | |
| Product aniline pt., ° F | 51 | 53 | 50 | 52 | 57 | 56 |

[2] Synthetic toluene yield based on methylcyclohexane in feed.

It will be observed that the toluene yield increased from 3 to 5.5 vol. percent as a result of the sulfiding. Also it is shown that whether the sulfiding is carried out over the oxidized or the reduced form of the catalyst made very little difference.

In the accompanying drawing I have shown diagrammatically, an apparatus in which a reforming operation may be carried out.

Referring in detail to the drawing, 1 represents a reactor containing the catalyst. The oil feed enters the system through line 3, mixes with "recycle gas" that is gas rich in hydrogen, from line 5 and the mixture is then passed through a furnace 10 and thence discharged via line 11 into it contacts as it flows upwardly, a downward flow oil, such as a naphtha, introduced through line 25. The naphtha or other petroleum oil serves to scrub out the methane and other hydrocarbon gases whereupon the hydrogen enriched gas is withdrawn through line 30 and pumped by pump or compressor 32 through line 5 for further use. A portion of this hydrogen may be withdrawn from the system through line 35. The fat oil, that is the oil containing the dissolved hydrocarbons, is withdrawn from absorber 22 through line 40 and passed into a stripper 42 where it is heated to remove dissolved gases by volatilization, and these gases are withdrawn overhead through line 45. Lean oil is withdrawn from the stripper through line 50, cooled in a cooler 52 and thence pumped by pump 53 into recycle line 25 for further use in the process.

The raw product is removed as bottoms from separator 18 through a line 60 carrying a pressure reducing valve 62 and is discharged with the gas in line 45 into a stabilizer 70 from which the gases are recovered overhead through line 72 while the product is withdrawn through line 73, cooled in a cooler 74 and collected in a receiving drum 75.

Normally, the so-called hydroforming operation is a cyclic process, that is to say, the operation just now described as reforming is operated for a period of four hours and then the oil feed is discontinued to regenerate the catalyst because the catalyst acquires tarry or coky deposits which of course reduce its activity; hence the catalyst requires the periodic regeneration referred to.

In the foregoing description and in the accompanying drawing, I have not shown all of the equipment that may be used to facilitate the process. For instance, additional heat exchangers, flow meters, and other engineering expedients can be used advantageously to improve the operation.

I have previously described in detail the method of actually operating the regeneration and it will not be necessary at this point to repeat it in connection with the drawing. It will be sufficient to say that during regeneration of course the valve in oil feed line 3 is closed and the catalyst is purged with inert gas from line 82. As previously stated, this purging gas is preferably flue gas at first followed by nitrogen. Thereafter the catalyst is treated with air from line 80 and again purged, then it is treated with hydrogen sulfide from line 85, then it is oxidized with air from 80 again, purged, repressured and placed on stream, all of which regeneration procedure has been fully disclosed hereinbefore. It is pointed out that the regeneration fumes may be stored for further use by withdrawing them from the reactor through line 12, thence passing them through line 92, thence through a cooler 94, thence through gas blower 96 and thence passing them to storage drum 102 via line 100. It is preferable to employ a purging gas which contains less than 6% free oxygen and the material therefore stored in 102 should not contain more than this quantity of free oxygen. During the regeneration or purging, regeneration gas may be recycled through line 98 to line 90 as desired. It is also pointed out, as previously explained, that some of the purging gases, such as nitrogen, may be upflowing and provision is made for this upflow through line 103 which enters the bottom of reactor 1. Furthermore, I provide a line 104 for venting gases during the depressuring.

I consider that my improvements have the advantages not only of increasing the activity of a used catalyst, or rather a catalyst which has been in operation for an extended period of time, but also that the process can be modified to include the treatment with hydrogen sulfide in situ, without any change from the currently existing catalyst temperature and without any changes in the pressure conditions. Instead of using $H_2S$, I may use any volatile sulfide such as $CS_2$. Also, as previously indicated, my process is applicable not only to the treatment of the reforming catalysts but generally to the reactivation of metallic oxides whether they be used in naphtha reforming, dehydrogenation, or aromatization, or for any other purpose.

Numerous modifications of my invention will suggest themselves to those who are familiar with this art.

What is claimed is:

1. A process of reforming naphthenic naphthas employing a catalyst consisting of an oxide of the VI group of the periodic system supported on an extending agent, which comprises contacting the naphtha at elevated temperatures and pressures with the catalyst in a reaction zone during the productive phase, discontinuing the flow of naphtha to the reaction zone when the catalyst has become contaminated with deposits, purging the catalyst with an inert gas to remove volatile hydrocarbons, thereafter treating the catalyst with an oxygen-containing gas to cause combustion of the contaminants on the catalyst, thereafter lowering the gas pressure in the reaction zone, purging the catalyst to remove oxygen therefrom, treating the catalyst with a volatile sulfide to convert the VI group oxide to the sulfide, thereafter treating the catalyst with an oxygen-containing gas to reoxidize the VI group sulfide to the oxide, and purging the catalyst to prepare it for the onstream phase of the cycle.

2. The method set forth in claim 1 in which the catalyst is treated with the volatile sulfide at pressures substantially lower than those employed during the productive phase of the cycle.

3. The method set forth in claim 1 in which the volatile sulfide is $H_2S$.

4. The method set forth in claim 1 in which the VI group oxide component of the catalyst is molybdenum oxide.

5. The method set forth in claim 1 in which added hydrogen is present in the reaction zone during the productive phase for the purpose of repressing carbonaceous deposition on the catalyst.

6. The method of extending the active life of a VI group oxide catalyst employed in the reforming of naphthenic naphthas, which comprises regenerating the catalyst fouled during the reforming operation by treatment with an oxygen-containing gas at elevated temperatures and pressures whereby the contaminants are consumed by combustion, thereafter treating the catalyst at a lower pressure with hydrogen sulfide whereby the VI group oxide is converted to the corresponding sulfide, thereafter treating the said sulfide with oxygen to form the corresponding oxide and employing the catalyst in this form in the productive phase.

CLINTON H. HOLDER.